(12) United States Patent
Lindsey et al.

(10) Patent No.: US 7,999,180 B2
(45) Date of Patent: Aug. 16, 2011

(54) HIGH VOLTAGE WIRING SYSTEM FOR ELECTRIC POWERTRAINS

(75) Inventors: Robert Wayne Lindsey, Washington, IL (US); Robert Roy Sychra, Washington, IL (US)

(73) Assignee: Caterpillar Inc., Peoria, IL (US)

(*) Notice: Subject to any disclaimer, the term of this patent is extended or adjusted under 35 U.S.C. 154(b) by 928 days.

(21) Appl. No.: 11/987,549

(22) Filed: Nov. 30, 2007

(65) Prior Publication Data
US 2009/0139740 A1 Jun. 4, 2009

(51) Int. Cl.
*H05K 5/06* (2006.01)
(52) U.S. Cl. ......... 174/50.5; 174/50; 174/520; 174/539; 180/65.1; 361/752; 307/10.1
(58) Field of Classification Search ............ 174/50, 174/50.5, 520, 17 R, 539, 564, 32, 17 GF; 307/9.1, 91, 24, 45, 86, 101; 180/65.1, 65.8, 180/122; 361/600, 601, 752, 796, 724; 318/803, 318/801
See application file for complete search history.

(56) References Cited

U.S. PATENT DOCUMENTS

| | | | |
|---|---|---|---|
| 4,000,362 A | 12/1976 | Kawaguchi et al. | |
| 5,440,916 A | 8/1995 | Stone et al. | |
| 5,603,892 A | 2/1997 | Grilletto et al. | |
| 5,623,963 A | 4/1997 | Stommes et al. | |
| 5,818,673 A * | 10/1998 | Matsumaru et al. | 307/10.1 |
| 6,116,364 A | 9/2000 | Taguchi et al. | |
| 6,149,544 A | 11/2000 | Masberg et al. | |
| 6,534,883 B2 | 3/2003 | Yoshida et al. | |
| 6,549,426 B1 | 4/2003 | Lawlyes et al. | |
| 6,578,649 B1 * | 6/2003 | Shimasaki et al. | 180/65.8 |
| 6,781,052 B2 | 8/2004 | Hasenauer | |
| 6,855,882 B2 * | 2/2005 | Celauro | 174/17 GF |
| 6,984,783 B2 * | 1/2006 | Kusumi et al. | 174/50 |
| 7,028,819 B2 | 4/2006 | Saito et al. | |
| 7,040,433 B2 | 5/2006 | Yamamoto et al. | |
| 7,173,395 B2 * | 2/2007 | Matsubara et al. | 318/803 |

(Continued)

FOREIGN PATENT DOCUMENTS

| | | |
|---|---|---|
| EP | 1404168 A | 3/2004 |
| FR | 2901091 A | 11/2007 |
| WO | 8806835 A | 9/1988 |

OTHER PUBLICATIONS

Liquid-tight Flexible Conduits, available at http://www.delikon.com/images/liquid6.jpg at least as early as Jul. 10, 2006 (1 page).

*Primary Examiner* — Angel R Estrada
(74) *Attorney, Agent, or Firm* — Finnegan, Henderson, Farabow, Garrett & Dunner LLP

(57) ABSTRACT

A high voltage wiring system for an electric powertrain is disclosed. The system includes a power conversion unit sealed in a first enclosure. The system also includes at least one second enclosure configured to be sealed and having at least one cable disposed therein. The disclosed system further includes a plurality of wiring termination compartments configured to provide a plurality of electrical termination points. The plurality of wiring termination compartments are separately encased in a material configured to provide a sealed barrier between an outside environment and the plurality of electrical termination points. The disclosed system further includes a source of at least one pressurized gas configured to substantially prevent the ingress of moisture into the first enclosure, the at least one second enclosure, and the plurality of wiring termination compartments.

25 Claims, 2 Drawing Sheets

U.S. PATENT DOCUMENTS

| | | | |
|---|---|---|---|
| 7,880,097 B2 * | 2/2011 | Moore et al. | 174/539 |
| 7,880,326 B2 * | 2/2011 | Khan et al. | 307/10.1 |
| 2003/0192714 A1 | 10/2003 | Hasenauer | |
| 2005/0052080 A1 | 3/2005 | Maslov et al. | |
| 2006/0198072 A1 | 9/2006 | Inaba et al. | |
| 2007/0089918 A1 | 4/2007 | Gonzalez | |
| 2007/0158118 A1 | 7/2007 | King | |
| 2007/0203629 A1 | 8/2007 | Tarasinski et al. | |

* cited by examiner

HIGH VOLTAGE WIRING SYSTEM FOR ELECTRIC POWERTRAINS

TECHNICAL FIELD

The present disclosure relates generally to a high voltage wiring system, and more particularly, to a high voltage wiring system for electrical components in a powertrain.

BACKGROUND

Machines such as, for example, articulated trucks, dozers, loaders, excavators, motor graders, and other types of machinery are often deployed in hostile environments. For example, an articulated truck may be used in a mining setting, a loader may be used in national emergencies, and/or a dozer may be used for beach restoration. In these hostile environments, the powertrain and wiring systems are subject to physical abrasions, water submersion, debris accumulation, and/or other extreme conditions that may be detrimental to the machine. Current wiring systems for hostile environments typically use jacketed cable or conduits to protect the wiring. These solutions usually provide only rudimentary protection for the powertrain and/or wiring system.

One method of countering the negative aspects of hostile environments on powertrains is set forth in U.S. Pat. No. 6,549,426 (the '426 patent) issued to Lawlyes et al. The '426 patent describes an electronic assembly for electrical components that may be deployed in a powertrain. The electronic assembly in the '426 patent includes base and cover elements, as well as matting grooves and perimeter tongue elements. The '426 patent further includes an adhesive material in the matting grooves to increase protection for the electronic components located therein.

Although the electronic assembly in the '426 patent may overcome some of the drawbacks of using powertrains in hostile environments, the electronic assembly in the '426 patent may be inefficient for long term deployments in hostile environments. For example, the electronic assembly in the '426 patent may not have the ability to alert an operator of breaches in the electronic assembly. Furthermore, the electronic assembly in the '426 patent may not protect high voltage wiring termination points in a powertrain.

The disclosed system is directed to overcoming one or more of the shortcomings set forth above.

SUMMARY

In one aspect, the present disclosure is directed to a powertrain system having a power conversion unit sealed in a first enclosure. The system also includes at least one second enclosure configured to be sealed and having at least one cable disposed therein. The disclosed system further includes a plurality of wiring termination compartments configured to provide a plurality of electrical termination points. The plurality of wiring termination compartments are separately encased in a material configured to provide a sealed barrier between an outside environment and the plurality of electrical termination points. The disclosed system further includes a source to pressurize at least one gas, wherein the pressurized at least one gas is configured to substantially prevent the ingress of moisture into the first enclosure, the at least one second enclosure, and the plurality of wiring termination compartments.

In another aspect, the present disclosure is directed to a method. The method includes sealing a first enclosure, wherein a power conversion unit is located therein. The method further includes sealing at least one second enclosure, wherein at least one electrical wire located therein is configured to allow a flow of an electrical current between a plurality of locations. The method further includes sealing a plurality of enclosures, wherein at least one electrical termination point located therein is configured to provide an electrical connection between the first enclosure and the at least one second enclosure. The method further includes pressurizing at least one gas, and supplying the pressurized at least one gas to at least one of the first enclosure, the at least one second enclosure, and the plurality of enclosures. The method further includes monitoring a pressure from at least one of the first enclosure, the at least one second enclosure, and the plurality of enclosures.

DETAILED DESCRIPTION

Figure 1:
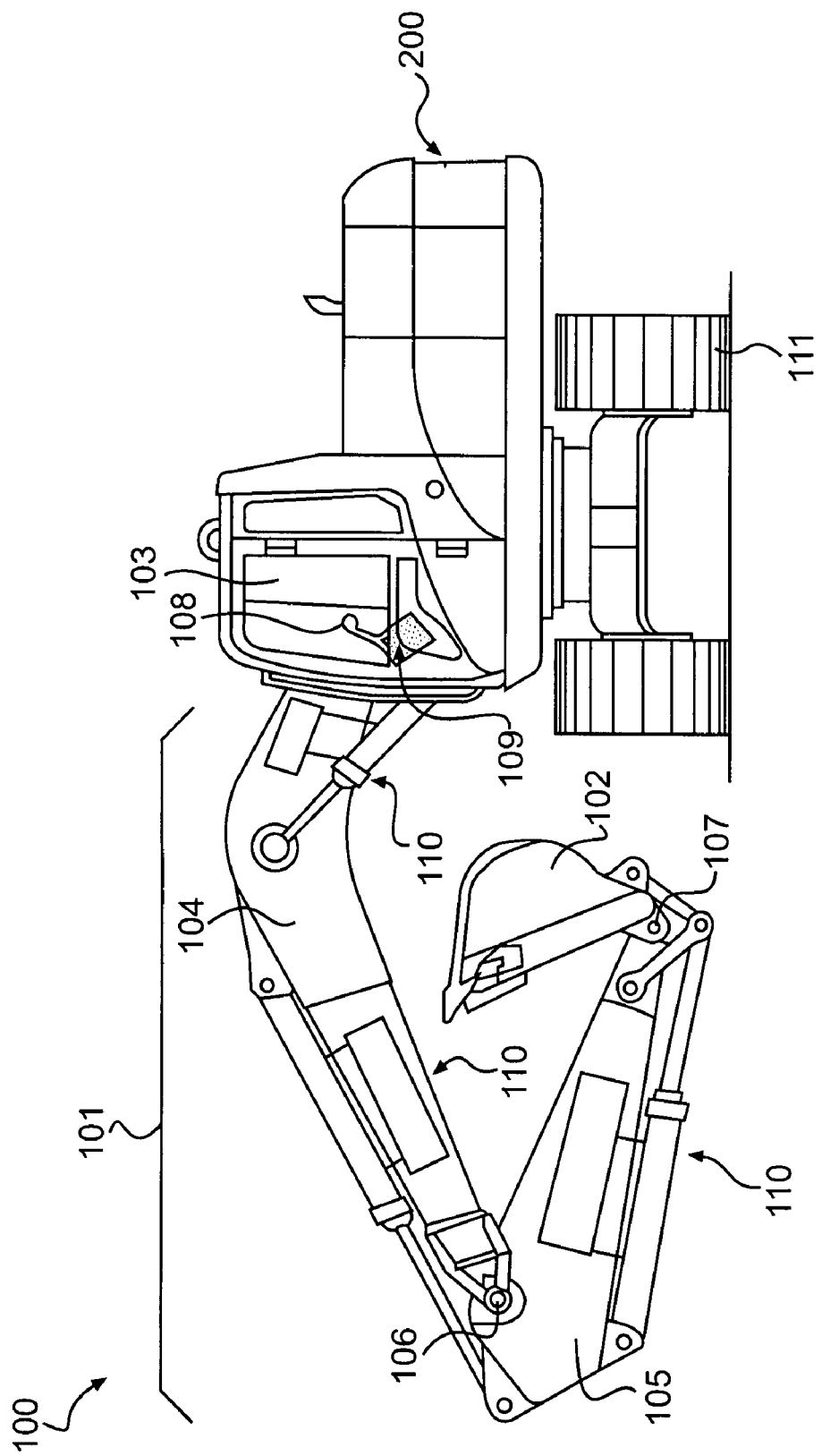
FIG. 1 is a diagrammatic illustration of an exemplary disclosed machine.

FIG. 1 illustrates an exemplary machine 100. Machine 100 may be a fixed or mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a linkage system 101, an instrument 102 attachable to linkage system 101, and an operator interface 103 used to control motion of linkage system 101.

Linkage system 101 may include any structural unit that supports movement of machine 100 and/or instrument 102. Linkage system 101 may include, for example, a stationary base frame (not referenced), a boom 104, and a stick 105. Boom 104 may be pivotally connected to the frame, and stick 105 may be pivotally connected to boom 104 at a joint 106. Instrument 102 may be pivotally connected to stick 105 at a joint 107. It is contemplated that linkage system 101 may include one or more alternative configuration and/or any number of linkage members.

Numerous different instruments 102 may be attachable to stick 105 and controllable via operator interface 103. Instrument 102 may include any device used to perform a particular task such as, for example, a bucket, a fork arrangement, a blade, a shovel, a ripper, a dump bed, a broom, a snow blower, a propelling device, a cutting device, a grasping device, or any other task-performing device known in the art. Instrument 102 may be configured to pivot, rotate, slide, swing, lift, or move relative to machine 100 in any manner known in the art.

Operator interface 103 may be configured to receive input from a machine operator indicative of a desired work tool movement. Specifically, operator interface 103 may include an operator interface device 108 and an electronic control module 109. In one embodiment, operator interface device 108 may be a multi-axis joystick located to one side of an operator station. Operator interface device 108 may be a proportional-type controller configured to position and/or manipulate instrument 102 by producing and sending an interface device position signal to electronic control module 109. The interface device position signal may be indicative of a desired movement of instrument 102. It is contemplated that additional and/or different operator interface devices may be included within operator interface 103 such as, for example, wheels, knobs, push-pull devices, switches, pedals, and other operator interface devices known in the art.

Electronic control module 109 may include one or more components configured to perform system controls such as, for example, a memory, a secondary storage device, and a processor such as, for example, a central processing unit. One skilled in the art will appreciate that electronic control module 109 can contain additional or different components. Various other circuits such as, for example, power supply circuitry, signal conditioning circuitry, solenoid driver circuitry, and/or any other circuit that is known in the art may be associated with electronic control module 109.

Machine 100 may also include a plurality of hydraulic actuators 110 interconnecting linkage system 101. Hydraulic actuators 110 may be interconnected via one or more hydraulic systems (not shown), and controlled by electronic control module 109. Electronic control module 109 may communicate with hydraulic actuators 110 via control communication lines (not shown), and may be used to regulate operation of hydraulic actuators 110 in response to an operator input revived via operator interface device 108.

Machine 100 may include a traction device 111 located on each side of machine 100. Traction device 111 may include tracks, wheels, belts, or other traction devices. Traction device 111 may or may not be steerable. Machine 100 may further include an electric powertrain and wiring system 200 (e.g., a motor and a motor controller) mechanically connected to traction device 111. System 200 may be configured to move machine 100 via traction device 111. System 200 may further be configured to be pressurized in order to prevent the ingress of contaminants into the electric powertrain and wiring system. Furthermore, machine 100 is not limited to that of FIG. 1. For example, machine 100 may be a vehicle such as for example, an off highway truck. Further still, machine 100 may be a rail transport vehicle or a mobile rail car mover.

Figure 2:
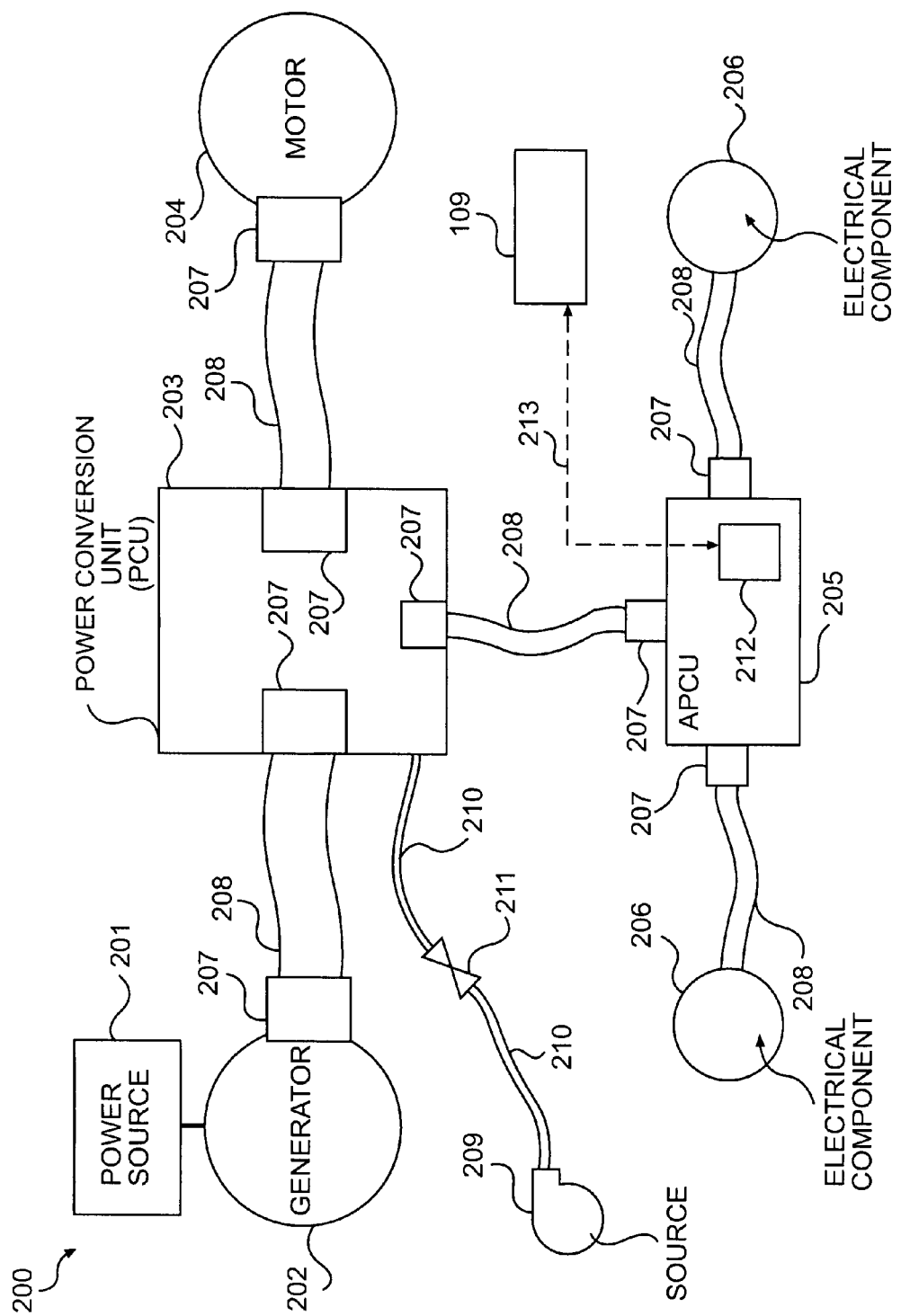
FIG. 2 is a diagrammatic illustration of an exemplary disclosed high voltage wiring apparatus for an electrical powertrain for the machine of FIG. 1.

As shown in FIG. 2, system 200 may include a power source 201, generator 202, power conversion unit 203, motor 204, auxiliary power conversion unit 205, and electrical components 206. The elements in system 200 may be operatively connected via a plurality of wiring enclosures 208. A plurality of termination compartments 207 may mechanically and electrically connect the plurality of wiring enclosures 208 with the electrical elements in system 200.

Power source 201 may be any power producing device that can produce mechanical energy. For example, power source 201 may be an internal combustion engine having multiple subsystems that cooperate to produce an output of mechanical power. One skilled in the art will recognize that power source 201 may be any type of internal combustion engine such as, for example, a gasoline or a gaseous fuel-powered engine. The subsystems included within power source 201 may include, for example, a fuel system, an air induction system, an exhaust system, a lubrication system, a cooling system, or any other utilized system.

Generator 202 may be a power producing/consuming device configured to mechanically receive power from power source 201, and convert at least a portion of that power into electricity. For example, generator 202 may be an alternating current synchronous generator, an induction generator, a permanent-magnet generator, a switched-reluctance generator, or any other generator known in the art that is capable of performing its operations. In one example, generator 202 may be configured to generate three-phase alternating current. It is contemplated that power source 201 and generator 202 may be replaced by a single device or multiple devices that can perform the tasks of both power source 201 and generator 202.

Power Conversion Unit (PCU) 203 may be an electronic device that may be configured to convert a flow of an electrical current, as well as condition a flow of an electrical current from generator 202 to motor 204. For example, PCU 203 may convert a flow of an electrical current from generator 202 to motor 204 by being configured to receive an input of fixed or variable frequency alternating current (AC) from generator 202, and then output a fixed or variable frequency AC, and/or direct current (DC) from the AC input. In another example, PCU 203 may power condition the flow of an electrical current from generator 202 by ensuring the electrical current is balanced, three phase, and sinusoidal. PCU 203 may use power semiconductor devices such as, for example, diodes, thyristors, transistors, transformers, etc. to complete power conditioning, electrical current rectification, and/or electrical current inversion.

PCU 203 may be sealed in a casing that is configured to provide electromagnetic interference (EMI) shielding, electrical shielding, and environmental shielding (i.e., shielding from water, chemicals, and/or physical abrasions). It is contemplated that PCU 203 may be encased by aluminum, steel, fiberglass or other metal alloys. PCU 203 may include conductive coatings for EMI shielding or be constructed from EMI shielding alloys such as, for example, Beryllium Copper.

PCU 203 may further include a pressure release valve (not shown) configured to control or limit the pressure in system 200. In one example, the pressure release valve may be configured to open if the pressure in system 200 exceeds a predefined threshold, thus allowing excess gas to disperse from system 200. The pressure release valve may be further configured to close once the pressure in system 200 decreases below the threshold, or another threshold.

Motor 204 may include multiple components that interact to produce mechanical power in response to electrical power consumption. Motor 204 may be coupled to an output shaft (not shown), and, as electrical power is supplied from generator 202 to motor 204 via PCU 203, motor 204 may generate a torque applied through output shaft (not shown) at a range of rotational speeds. Output shaft (not shown) may be connected to traction device 111 of machine 100, to thereby propel machine 100 in response to the applied torque.

Auxiliary power conversion unit (APCU) 205 may be substantially similar to PCU 203. In addition, APCU 205 may be configured to convert and condition a flow of an electrical current from generator 202 to electrical components 206.

Electrical component 206 may include one or more power producing/consuming device(s) that may receive electricity for operation such as, for example, lights, heating and/or cooling devices, air compressors, pumps, actuators for moving various components of machine 100, and/or various other types of electric components. In one example, electrical component 206 may be electric motors that assist in moving linkage system 101 (FIG. 1). In another example, electrical component 206 may be spot-lights (not shown) that are used on machine 100. In yet a further example, electrical component 206 may be one or more fans that are configured to cool power source 201, and/or generator 202.

Wire termination compartments 207 may be sealed compartments that provide electrical termination points between the electrical components of system 200. Wire termination compartment 207 may be made from any relatively strong material such as, for example, steel, copper, and/or aluminum. In one exemplary example, compartments 207 may be substantially air-tight and/or removable to provide access to electrical wiring termination blocks (not shown) that may be located inside compartments 207. Additionally or alternatively, compartments 207 may contain an internal air passageway to allow the flow of a gas such as, for example, non-conductive gas (e.g., air or nitrogen) throughout system 200, via wiring enclosures 208. For example, the internal air passageway inside compartments 207 may allow for a non-conductive gas to travel to generator 202, motor 204, electrical components 206, and/or any other appropriate element of system 200. The non-conductive gas may substantially prevent the ingress of moisture into generator 202, motor 204, electrical components 206, and/or any other appropriate element of system 200.

Enclosures 208 may be sealed enclosures containing cables such as, for example, electrical wires and/or fiber optic cables, wherein the electrical wires and/or cables are configured to allow a flow of an electrical current and/or signals between a plurality of locations in system 200. Enclosures 208 may be configured to provide environmental protection to the electrical wiring located therein. For example, enclosures 208 may be water proof or resistant, and/or substantially air tight, and may prevent the electrical wiring located therein from being affected by water, oil, chemical and/or physical abrasion (e.g., from rocks, gravel, etc.), and/or other contaminants that may adversely affect the functionality of the electrical wiring. Furthermore, enclosures 208 may act as a barrier to prevent accidental contact between the internal wiring and the frame of machine 100, service personnel, and/or a machine operator. Enclosures 208 may be comprised of a non-conducting material on the outer and inner surfaces. Additionally or alternatively, enclosures 208 may contain an electrically conductive material (e.g., stainless steel braid) between the inner and outer layer to provide electromagnetic interference shielding and mechanical rigidity to enclosures 208.

System 200 may further include a source 209 configured to provide a gas throughout system 200 via a hose 210. For example, source 209 may provide a non-conductive gas (e.g., air and/or nitrogen) at a relatively low positive pressure. In one exemplary embodiment, the low positive pressure may be 5 psi. The non-conductive gas may prevent the ingress of water and/or air moisture into system 200, wherein the ingress of water and/or air moisture is caused by minor air leaks from failures in system 200, and/or temperature differentials or atmospheric pressure changes. Source 209 may be comprised of a pump, accumulator, pressure vessel, or part of another system on machine 100 capable of providing pressurized fluid. It is contemplated that source 209 may include components to filter, dry, and regulate the non-conductive gas.

A check valve 211 may be included in system 200. In one exemplary example, check valve 211 may be configured to provide a passage for the non-conductive gas from source 209 to PCU 203. Check valve 211 may provide the passage when the pressure of the non-conductive gas from source 209 is greater than the pressure of the non-conductive gas inside other elements of system 200. Check valve 211 may further be configured to substantially block the passage for the non-conductive gas when the pressure of the non-conductive gas from source 209 is lower than the pressure of the non-conductive gas in the other elements of system 200. It is contemplated that check valve 211 may be a component of source 209, part of PCU 203, or part of hose 210.

System 200 may further include a non-conductive gas pressure monitor 212. Pressure monitor 212 may be configured to monitor the non-conductive gas pressure characteristics within system 200, as well as transmit a signal indicative of the characteristics to electronic control module 109. The monitoring of the pressure, and the transmission of the pressure characteristics may be completed periodically and/or continuously over a data link 213. Data link 213 may be a wired connection, a wireless connection, or a combination thereof.

For example, pressure monitor 212 may continuously and/or periodically monitor and send pressure characteristics to electronic control module 109. During the monitoring and sending of pressure characteristics to electronic control module 109, a failure in one of the plurality of enclosures 208 may occur do to flying debris. The failure may allow for an unusual rate in the decline in pressure in system 200. In this example, pressure monitor 212 may send a signal to electronic control module 109 via data link 213. The signal sent from pressure monitor 212 to electronic control module 109 may indicate the rate of the loss of pressure from system 200. In another example, one of compartments 207 may be left open after servicing of machine 100. In this example, pressure monitor 212 may send a signal to electronic control module 109 indicative of the detrimental pressure in system 200.

Electronic control module 109 may be configured to alert an operator of the pressure characteristics by any suitable means. In one example, electronic control module 109 may alert an operator of the pressure characteristics by a flashing or steady light, and/or a sound, such as, a buzzer. Electronic control module 109 may also be configured to alert a repair facility of the pressure characteristics. For example, electronic control module 109 may use wireless means to alert a repair facility of the pressure characteristics so that the repair facility may know if the particular machine needs repair. Additionally or alternatively electronic control module 109 may have a wired connection that allows a repair facility (and/or an operator) to plug in a device that allows the repair facility (and/or an operator) to get more detailed information about the pressure characteristics.

INDUSTRIAL APPLICABILITY

The disclosed wiring system may be implemented in machines that include an electric powertrain. In particular, the disclosed wiring system may extend the life of an electric powertrain in hostile environments by providing protection from physical abrasions, water submersion, debris accumulation, and/or other extreme conditions that are detrimental to an electric powertrain and wiring system.

Wiring enclosures 208 may be used to protect the high voltage electrical wiring interconnecting the electrical elements of an electric powertrain. Wiring terminations points may be enclosed within wire termination compartments 207. The enclosures 208 and/or compartments 207 may be substantially air tight. Compartments 207 may have air passageways that allow gas to travel throughout system 200 via enclosures 208. Source 209 may supply pressurized non-conducting gas (e.g., air or nitrogen) into system 200 via PCU 203. The non-conducting gas may travel throughout system 200 via compartments 207 and enclosures 208.

If the pressure within system 200 exceeds a first threshold, a maximum pressure relief device (not shown) within system 200 (e.g., within PCU 203) may release at least a portion of the pressurized gas (air) into the outside environment. Once the pressure in system 200 drops below a second threshold, the maximum pressure relief device (not shown) may close.

The pressure in system 200 may be monitored by pressure monitor 212. Pressure monitor 212 may be configured to transmit a signal indicative of the pressure in system 200 to electronic control module 109. The transmission of the signal may be periodically and/or continuously over a data link 213 by any manner known in the art.

In one example, a physical abrasion resulting from flying gravel may cause a relatively large failure of at least one of the plurality of enclosures 208. The failure of at least one of the enclosures 208 may result in a drop in pressure in system 200. In this example, pressure monitor 212 may send a signal indicative of the drop in pressure to electronic control module 109 via data link 213. In another example, a physical abrasion caused by flying gravel may result in a relatively small air leak in one of the plurality of compartments 207 and/or enclosures 208. In this example, the small air leak may cause the ingress of water and/or air moisture into system 200. Source 209 may be configured to substantially prevent the ingress of water and/or air moisture into system 200 by maintaining a positive pressure in system 200.

The disclosed system may protect an electric powertrain in hostile environments by providing protection for not only the individual elements in a system, but also for the electrical interconnection of the elements is a system. Furthermore, the disclosed system may be capable of long term deployment in hostile environments because the disclosed system provides a way of notifying an operator of failures in the disclosed system.

It will be apparent to those skilled in the art that various modifications and variations can be made to the disclosed high voltage wiring system. Other embodiments will be apparent to those skilled in the art from consideration of the specification and practice of the disclosed apparatus and method. It is intended that the specification and examples be considered as exemplary only, with a true scope being indicated by the following claims and their equivalents.

What is claimed is:

1. An electric powertrain system, comprising:
   a power conversion unit sealed in a first enclosure;
   at least one second enclosure configured to be sealed, wherein at least one cable is disposed therein;
   a plurality of third enclosures configured to be sealed and to provide at least one electrical termination point, the at least one electrical termination point being configured to provide an electrical connection between the first enclosure and the at least one second enclosure; and
   a source to pressurize at least one gas and being configured to supply the pressurized at least one gas to the first enclosure, the at least one second enclosure, and the plurality of third enclosures.

2. The system of claim 1, further including at least one pressure monitoring device configured to monitor a pressure of at least one of the first enclosure, the at least one second enclosure, and the plurality of third enclosures, the plurality of third enclosures being a plurality of wiring termination compartments.

3. The system of claim 2, further including at least one electronic control module configured to:
   monitor the at least one pressure monitoring device; and
   send a signal to an operator, wherein the signal is indicative of the pressure of the at least one of the first enclosure, the at least one second enclosure, and the plurality of wiring termination compartments.

4. The system of claim 1, wherein the pressurized at least one gas is a non-conducting gas.

5. The system of claim 4, wherein the non-conducting gas is air.

6. The system of claim 4, wherein the non-conducting gas is nitrogen.

7. The system of claim 1, wherein:
   the plurality of third enclosures are a plurality of wiring termination compartments; and
   the first enclosure is electrically connected to at least one of the plurality of wiring termination compartments by the at least one second enclosure.

8. The system of claim 7, wherein the electrical connection is configured to allow for a flow of the pressurized at least one gas between the first enclosure, the at least one second enclosure, and at least one of the plurality of wiring termination compartments.

9. The system of claim 1, further including at least one check valve.

10. The system of claim 1, wherein:
    the plurality of third enclosures are a plurality of wiring termination compartments; and
    at least one of the plurality of wiring termination compartments is configured to provide an electromagnetic interference shielding for the plurality of electrical termination points.

11. The system of claim 1, wherein the at least one second enclosure is configured to provide an electromagnetic interference shielding for the at least one cable disposed therein.

12. The system of claim 1, wherein the at least one cable is at least one electrical wire.

13. The system of claim 1, wherein the at least one cable is at least one fiber optic cable.

14. The system of claim 1, wherein the pressurized at least one gas is further configured to substantially prevent the ingress of moisture into at least one power producing device and at least one power consuming device.

15. The system of claim 1, wherein the at least one electrical termination point is at least one of a plurality of electrical termination points, and the plurality of third enclosures are separately encased in a material configured to provide a sealed barrier between an outside environment and the plurality of electrical termination points.

16. The system of claim 1, wherein the pressurized at least one gas is configured to substantially prevent the ingress of moisture into the first enclosure, the at least one second enclosure, and the plurality of third enclosures.

17. A method of sealing a powertrain, comprising:
    sealing a first enclosure, wherein a power conversion unit is located therein;
    sealing at least one second enclosure, wherein at least one cable is located therein;
    sealing a plurality of third enclosures, wherein at least one electrical termination point located therein is configured to provide an electrical connection between the first enclosure and the at least one second enclosure;
    pressurizing at least one gas; and
    supplying the pressurized at least one gas to at least one of the first enclosure, the at least one second enclosure, and the plurality of third enclosures.

18. The method of claim 17, wherein the at least one gas is non-conducting.

19. The method of claim 17, further including shielding at least one of the plurality of third enclosures from electromagnetic interference.

20. The method of claim 17, further including relieving a pressure from at least one of the first enclosure, the at least one second enclosure, and the plurality of third enclosures.

21. The method of claim 17, further comprising monitoring a pressure from at least one of the first enclosure, the at least one second enclosure, or the plurality of third enclosures.

22. The method of claim 21, further including sending a signal to an operator, wherein the signal is indicative of the monitored pressure from the at least one of the first enclosure, the at least one second enclosure, and the plurality of third enclosures.

23. A machine, comprising:
   at least one power producing device;
   at least one power consuming device;
   a power conversion unit sealed in a first enclosure;
   at least one second enclosure having at least one electrical wire disposed therein;
   a plurality of wiring termination compartments configured to provide an electrical termination point for electrically connecting the at least one power producing device, the at least one power consuming device, and the power conversion unit, wherein the plurality of wiring termination compartments are separately encased in a material configured to provide a sealed barrier between external environment and the electrical termination point; and
   at least one pressure source configured to provide at least one non-conductive positive pressure gas to at least the first enclosure.

24. The machine of claim 23, further comprising at least one pressure release device.

25. The machine of claim 23, further comprising:
   a pressure monitoring device configured to monitor a pressure in at least one of the first enclosure, the at least one second enclosure, and the plurality of wiring termination compartments; and
   an electronic control module configured to monitor the pressure monitoring device and send a signal to an operator, wherein the signal is indicative of the pressure of the at least one of the first enclosure, the at least one second enclosure, and the plurality of wiring termination compartments.

* * * * *